United States Patent [19]
Chung

[11] Patent Number: 5,954,354
[45] Date of Patent: Sep. 21, 1999

[54] FIXING DEVICE FOR A REMOVABLE MUDGUARD OF A BICYCLE

[75] Inventor: Hsu Kuo Chung, Changhua Hsien, Taiwan

[73] Assignee: Sunny Wheel Industrial Co., Ltd, Changhua Hsien, Taiwan

[21] Appl. No.: 09/027,247

[22] Filed: Feb. 20, 1998

[51] Int. Cl.⁶ .................................................. B62D 25/18
[52] U.S. Cl. .................................. 280/152.1; 280/152.3; 280/852; 403/97
[58] Field of Search ............................. 280/152.2, 152.1, 280/152.3, 851, 852, 288.4; 403/141, 142, 143, 97, 94, 84, 83; D12/114, 186; 224/412, 414

[56] References Cited

U.S. PATENT DOCUMENTS

| | | | |
|---|---|---|---|
| 892,105 | 6/1908 | White ....................................... | 403/141 |
| 4,620,813 | 11/1986 | Lacher ...................................... | 403/93 |
| 4,980,805 | 12/1990 | Maglica et al. ........................... | 362/72 |
| 5,112,071 | 5/1992 | Jones ..................................... | 280/152.3 |
| 5,230,580 | 7/1993 | Henkel ..................................... | 403/135 |
| 5,330,283 | 7/1994 | Ballard ..................................... | 403/97 |
| 5,660,363 | 8/1997 | Maglica ............................. | 248/288.31 |
| 5,788,394 | 8/1998 | Hess et al. ............................... | 403/52 |

*Primary Examiner*—Richard M. Camby
*Assistant Examiner*—David R. Dunn
*Attorney, Agent, or Firm*—Browdy and Neimark

[57] ABSTRACT

A fixing device for use on a bicycle to removably secure a universal mudguard to the rear wheel of the same. The mudguard is provided with a ball-shaped supporting member at one end thereof. A pair of symmetric clamping pieces are removably secured to the seat pillar of a bicycle by a fastening bolt and nut. Each clamping piece has a semi-spherical cavity on the inner wall thereof, having radially extended protrusions in correspondence to the ball-shaped supporting member, so as to permit the supporting member to be adjustably retained therein.

2 Claims, 2 Drawing Sheets

FIXING DEVICE FOR A REMOVABLE MUDGUARD OF A BICYCLE

BACKGROUND OF THE INVENTION

The present invention relates to a fixing device for use on a bicycle to secure a removable mudguard to the same. The fixing device removably attached to the seat pillar of a bicycle is made up of two clamping pieces that are fixed in place by bolt and nut. Each clamping piece has a semi-sphere cavity on the inner wall thereof which is provided with a plurality of radially defined protrusions. The mudguard has a ball-shaped supporting member disposed at the front end thereof which is provided with continuous teeth along the equatorial periphery and a plurality of radial protrusions on each polar surface thereof so that the ball-shaped supporting member can be adjustably retained in place by engagement with the inner surfaces of the cavities of the clamping pieces.

In general, the common sports bicycle is equipped with neither a front nor a rear mudguard, in such a case, a rider of the same will be spattered with dirty mud in rainy days when riding on roads. Therefore, such a bicycle will not be preferably used by riders in bad weather.

Manufacturers of bicycles have attempted to develop a rear mudguard which can be suitable for and easily mounted onto various types of bicycle, such as racing bicycles, field bicycles, or common bicycles, especially for use in rainy days.

SUMMARY OF THE INVENTION

The primary object of the present invention is to provide a fixing device for a universal mudguard which can be easiy mounted to and dismounted from a bicycle.

Another object of the present invention is to provide a fixing device for a universal mudguard which can be adjustably fixed to a bicycle of any kind and size.

DETAILED DESCRIPTION OF THE PREFERRED EMBODIMENTS

Figure 1:
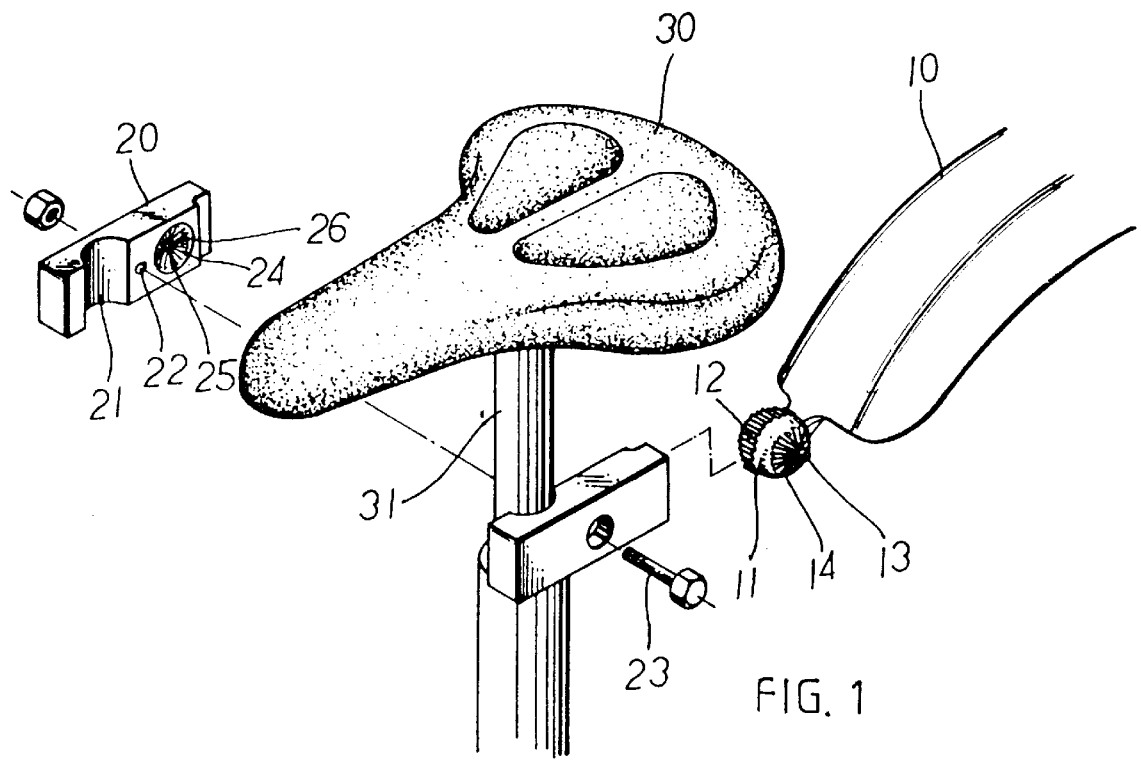
FIG. 1 is a perspective diagram showing the exploded components of the present invention.

Referring to FIG. 1, the present invention is comprised of a pair of clamping pieces 20 and a mudguard 10 having a supporting member 11 at one end thereof which can be defined in a ball shape or any other configurations. The ball-shaped supporting member 11 is provider with continual teeth 12 along the equatorial periphery thereof, and a pivotal point 13 at the opposite poles of the same respectively. The polar surfaces of the supporting member 11 are provided with radially extended protrusions 14.

The inner face of each clamping piece 20 has a semi-cylindrical recess 21 at one end and a through hole 22 disposed next to the recess 21, and a semi-spherical cavity 24 disposed next to the through hole 22. The center of the cavity 24 is provided with a mounting hole 25 from which extended a plurality of radial protrusions 26 in correspondence to and engagement with the protrusions 14 on the supporting member 11.

Figure 2:
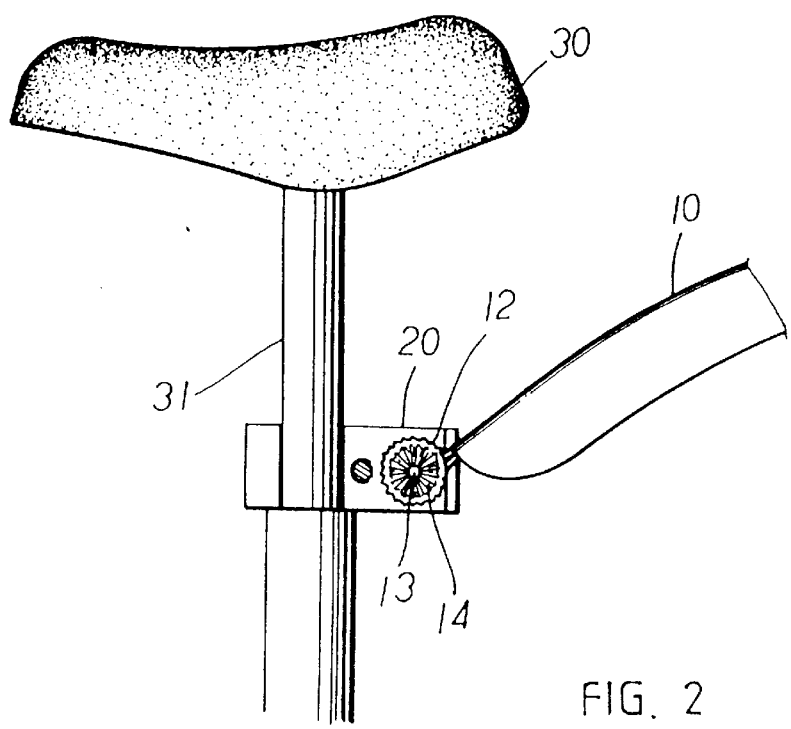
FIG. 2 is a vertically sectional view of the present invention.
Figure 3:
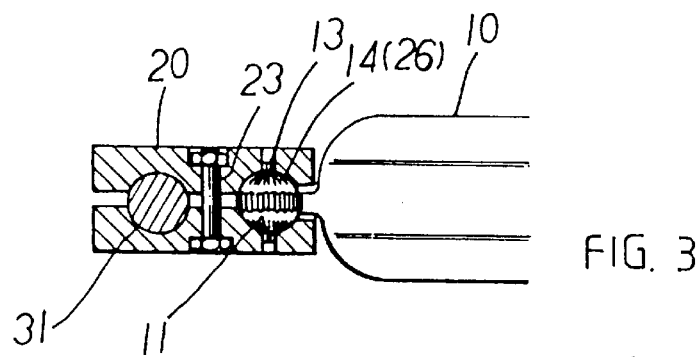
FIG. 3 is a horizontally sectional view thereof.

In assembly, the two symmetric clamping pieces 20 are bound together by a bolt and nut 23 with the ball shaped supporting member 11 retained therebetween in the cavities 24 and the semi-cylindrical recesses 21 engaged with the pillar 31 of the seat 30, as shown in FIGS. 2, 3, so that the fixing device of the mudguard can be secured to the seat pillar 31 with the mudguard adjustably associated with the fixing device.

When the clamping pieces 20 are tightened or loosened, the supporting member 11, having its two pivotal points 13 in engagement with the mounting holes 25 of the cavities 24 respectively and the radial protrusions 14 of the supporting member 11 in engagement with the radial protrusions 26 of the cavities 24, is able to be adjusted in such a manner that the mudguard 10 can be pivoted up and down in a certain range. Besides, the clamping pieces 20 are pivotally secured to the seat pillar 31 so that the mudguard can be pivoted horizontally in adjustment.

Figure 4:
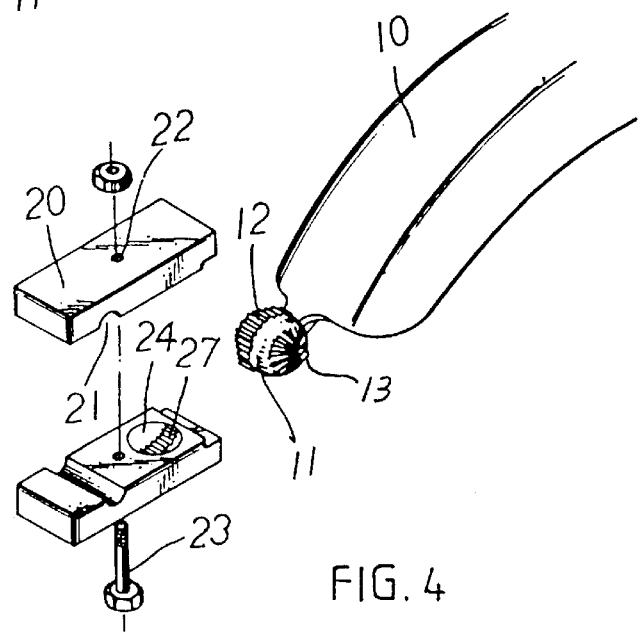
FIG. 4 is a diagram showing another embodiment of the present invention.
Figure 5:
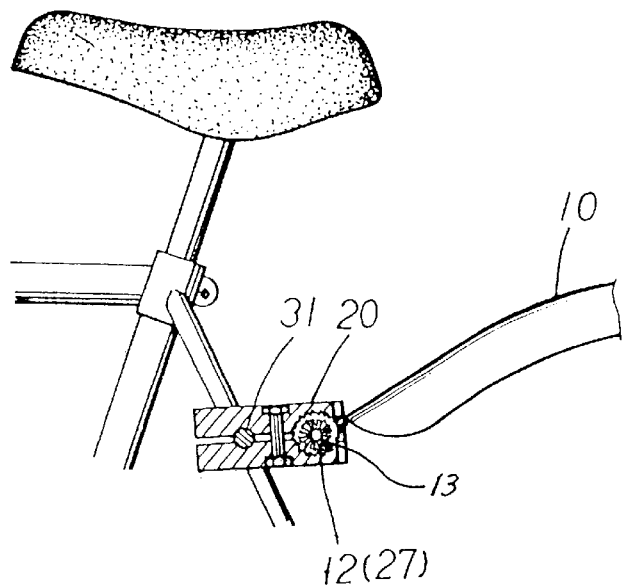
FIG. 5 is a vertically sectional view of FIG. 4.

In another embodiment, the protrusions 26 disposed in the cavities 24 can be replaced by continuous teeth 27 similar to and in engagement with those teeth 12 disposed on the ball-shaped supporting member 11, as shown in FIGS. 4, 5. The clamping pieces 20 in this embodiment are secured relatively in a horizontal manner in comparison to that in the first embodiment in which the clamping pieces 20 are held in a vertical manner, as shown in FIGS. 1, 2, so that the mudguard 10 can be adjustably pivoted.

Since the mudguard is mounted onto a bicycle only to prevent mud from spattering on the body of a rider in a rainy day, and be removed if desired, the shape of the mudguard can be designed not in a traditional way but in any shape as one wishes. The shape of the mudguard of the present invention is not described in this specification.

I claim:

1. A fixing device removably securing a mudguard to a bicycle;

wherein said the mudguard has a ball-shaped supporting member (1) at one end thereof engaged between a pair of clamping pieces, one side of each of said clamping pieces having a semi-cylindrical recess and a through hole, a fastening bolt passing through said through hole and engaged to a nut which with the fastening bolt, secures the clamping pieces together on the bicycle;

said clamping pieces and said ball-shaped supporting member having corresponding adjustment means for selective adjustment of the mudguard in a plane of the bicycle;

said adjustment means comprising:
      a semi-spherical cavity having protrusions on a surface thereof on each of said clamping pieces;

said ball-shaped supporting member having protrusion on a surface thereof corresponding to the protrusions of each said semi-spherical cavity;

wherein said protrusions of each said semi-spherical cavity extends from the center thereof in a radial manner, and said protrusions on said ball-shaped supporting member are defined also in a radial manner and are in corresponding engagement with the protrusions of each said cavity;

wherein said supporting member is provided with a pivot point at each of two opposite poles thereof which engage a mounting hole disposed at the center of each said semi-spherical cavity so as to assist in holding adjustment of said mudguard in the plane of the bicycle.

2. A fixing device removably securing mudguard to a bicycle;

wherein said the mudguard has a ball-shaped supporting member (1) at one end thereof engaged between a pair of clamping pieces, one side of each of said clamping piece; having a semi-cylindrical recess and a through hole, a fastening bolt passing through said through hole and engaged to a nut which with the fastening bolt, secures the clamping pieces together on the bicycle;

said clamping pieces and said ball-shaped supporting member having corresponding adjustment means for selective adjustment of the mudguard in a plane of the bicycle;

said adjustment means comprising:

a semi-spherical cavity having protrusions on a surface thereof on each of said clamping pieces;

said ball-shaped supporting member having protrusion on a surface thereof corresponding to the protrusions of each said semi-spherical cavity;

wherein each said semi-spherical cavity of said clamping piece has a line of teeth extending through a center thereof from edge to edge of the cavity engaging teeth on an equatorial periphery of said ball-shaped supporting member of said mudguard;

wherein said supporting member is provided with a pivot point at each of two opposite poles thereof which engage a mounting hole disposed at the center of each said semi-spherical cavity so as to assist in holding adjustment of said mudguard in the plane of the bicycle.

* * * * *